(12) United States Patent
Han et al.

(10) Patent No.: US 9,116,566 B2
(45) Date of Patent: Aug. 25, 2015

(54) LIQUID CRYSTAL DISPLAY DEVICE HAVING TOUCH SENSOR

(75) Inventors: Sang-Youn Han, Seoul (KR); Yeon-Sik Ham, Suwon-si (KR); Sung-Hoon Yang, Seoul (KR); Keun-Chan Oh, Cheonan-si (KR); Hee-Hwan Lee, Busan (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 864 days.

(21) Appl. No.: 12/917,940

(22) Filed: Nov. 2, 2010

(65) Prior Publication Data

US 2011/0205180 A1 Aug. 25, 2011

(30) Foreign Application Priority Data

Feb. 24, 2010 (KR) .................. 10-2010-0016715

(51) Int. Cl.
*G06F 3/041* (2006.01)
*G06F 3/044* (2006.01)
*G06F 3/045* (2006.01)
*G09G 3/36* (2006.01)

(52) U.S. Cl.
CPC .............. *G06F 3/0412* (2013.01); *G06F 3/044* (2013.01); *G06F 3/045* (2013.01); *G06F 2203/04103* (2013.01); *G09G 3/36* (2013.01)

(58) Field of Classification Search
CPC ....... G06F 3/0412; G06F 3/044; G06F 3/045; G06F 3/047; G06F 2203/04103; G09G 3/36
USPC .............. 345/173–175, 87; 178/18.01, 18.03, 178/18.05–18.06
See application file for complete search history.

(56) References Cited

U.S. PATENT DOCUMENTS

| 7,365,562 | B2 * | 4/2008 | Jeon .......................... 324/760.01 |
| 7,755,616 | B2 * | 7/2010 | Jung et al. ..................... 345/174 |
| 7,999,264 | B2 * | 8/2011 | Cho et al. ........................ 257/72 |

(Continued)

FOREIGN PATENT DOCUMENTS

| JP | 2000-076009 | 3/2000 |
| JP | 2008-186882 | 8/2008 |

(Continued)

OTHER PUBLICATIONS

English Abstract for Publication No. 2000-076009.

(Continued)

*Primary Examiner* — Jason Mandeville
(74) *Attorney, Agent, or Firm* — F. Chau & Associates, LLC

(57) ABSTRACT

A liquid crystal display having a touch screen panel (TSP) function includes a sensor unit formed on the first substrate; a first sensor wire disposed on the first substrate and a second sensor wire extending perpendicular to the first sensor wire, wherein the sensor unit includes a first sensor electrode connected to the first sensor wire and a second sensor electrode connected to the second sensor wire, wherein said first sensor electrode and said second sensor electrode connect when touched, and said first and second sensor wires confirm a touch position by transmitting a sensing current through the connection between the first sensor electrode and the second sensor electrode, a trench is formed near the sensor unit and a silicon protrusion pattern to increase the sensitivity of the touch screen panel.

18 Claims, 8 Drawing Sheets

(56) References Cited

U.S. PATENT DOCUMENTS

| | | | |
|---|---|---|---|
| 8,072,430 B2 * | 12/2011 | Kim et al. | 345/173 |
| 8,111,344 B2 * | 2/2012 | Moon et al. | 349/48 |
| 8,130,209 B2 * | 3/2012 | Chang | 345/174 |
| 8,345,173 B2 * | 1/2013 | Cho | 349/12 |
| 2002/0079512 A1 * | 6/2002 | Yamazaki et al. | 257/200 |
| 2005/0023534 A1 * | 2/2005 | Hong et al. | 257/72 |
| 2005/0174503 A1 * | 8/2005 | Kim et al. | 349/46 |
| 2006/0017710 A1 * | 1/2006 | Lee et al. | 345/173 |
| 2006/0109222 A1 | 5/2006 | Lee et al. | |
| 2006/0228821 A1 * | 10/2006 | Hong et al. | 438/30 |
| 2007/0177091 A1 * | 8/2007 | Song et al. | 349/143 |
| 2007/0194320 A1 * | 8/2007 | Cho et al. | 257/72 |
| 2008/0018613 A1 * | 1/2008 | Kim et al. | 345/173 |
| 2008/0117150 A1 * | 5/2008 | Tak et al. | 345/87 |
| 2008/0136759 A1 * | 6/2008 | Kim | 345/87 |
| 2008/0186288 A1 * | 8/2008 | Chang | 345/174 |
| 2008/0239175 A1 * | 10/2008 | Moon et al. | 349/12 |
| 2009/0091698 A1 | 4/2009 | Cho | |

FOREIGN PATENT DOCUMENTS

| | | |
|---|---|---|
| JP | 2009-135188 | 6/2009 |
| JP | 2009-135260 | 6/2009 |
| KR | 1020030065237 | 8/2003 |
| KR | 1020060033484 | 4/2006 |
| KR | 1020060056793 | 5/2006 |
| KR | 1020070048358 | 5/2007 |
| KR | 1020090035804 | 4/2009 |
| KR | 1020090058743 | 6/2009 |

OTHER PUBLICATIONS

English Abstract for Publication No. 1020030065237.
English Abstract for Publication No. 1020060033484.
English Abstract for Publication No. 1020060056793.
English Abstract for Publication No. 1020070048358.
English Abstract for Publication No. 2008-186882.
English Abstract for Publication No. 1020090035804.
English Abstract for Publication No. 1020090058743.
English Abstract for Publication No. 2009-135188.
English Abstract for Publication No. 2009-135260.

* cited by examiner

LIQUID CRYSTAL DISPLAY DEVICE HAVING TOUCH SENSOR

CROSS-REFERENCE TO RELATED APPLICATION

This application claims priority under 35 U.S.C. §119 from Korean Patent Application No. 10-2010-0016715 filed in the Korean Intellectual Property Office on Feb. 24, 2010, the contents of which are herein incorporated by reference in their entirety.

BACKGROUND OF THE INVENTION (a) Field of the Invention

The present disclosure is directed to a liquid crystal display including a touch sensor.

(b) Description of the Related Art

The present disclosure is directed to a display device and a manufacturing method thereof. More particularly, the present disclosure is directed to a display device and a manufacturing method including a touch sensor capable of improving display quality and touch sensitivity by improving visibility.

In general, a touch screen panel (hereinafter TSP) is a device for detecting a contact position and receiving information thereof if an object or a user's finger touches characters or images displayed on a screen of the liquid crystal display. A touch screen panel for transmitting or receiving information while a user's finger directly touches the information media is typically realized through various methods such as a resistive type, a capacitive type, a hybrid type that combines the resistive type and the capacitive type, and an optical type.

In general, resistive TSPs are widely used. A resistive TSP includes first and second transparent electrodes that are separated from each other by a predetermined interval and face each other. When the first and second transparent electrodes are applied with a voltage and contact each other, each voltage applied to the first and second transparent electrodes is measured to detect the contact position. In a capacitive TSP, the interval between the first electrode and the second electrode changes due to the applied pressure at the position where the touch input is applied, which changes the capacitance therebetween, after which the changed capacitance is detected to obtain the contact position. The generally-used resistive TSP is an external type, while the capacitive TSP is a panel embedded type. The panel embedded TSP has a decreased sensor sensitivity compared with the external type.

SUMMARY OF THE INVENTION

Accordingly, embodiments of the present invention can reduce the thickness and improve the sensor sensitivity of a TSP embodied in a display device by embodying a touch function in the display device.

A liquid crystal display including a touch sensor according to an exemplary embodiment of the present invention includes: a first substrate; a gate line disposed on the first substrate; a data line intersecting the gate line; a linear electrode; a first passivation layer that insulates the linear electrode from the gate line and the data line; a plate-shaped electrode overlapping the linear electrode; a second passivation layer that insulates the plate-shaped electrode from the linear electrode; a sensor unit formed on the first substrate including a sensor electrode for sensing a touch position; a second substrate facing the first substrate; a liquid crystal layer interposed between the first substrate and the second substrate; and a first trench disposed between the sensor unit and the linear electrode.

A liquid crystal display including a touch sensor according to another exemplary embodiment of the present invention includes: a first substrate; a gate line disposed on the first substrate; a data line intersecting the gate line; a linear electrode; a first passivation layer that insulates the linear electrode from the gate line and the data line; a plate-shaped electrode overlapping the linear electrode; a second passivation layer that insulates the plate-shaped electrode from the linear electrode; a sensor unit formed on the first substrate including a sensor electrode for sensing a touch position; a second substrate facing the first substrate; and a liquid crystal layer interposed between the first substrate and the second substrate, wherein the sensor unit includes a silicon protrusion pattern disposed under the sensor electrode.

A liquid crystal display including a touch sensor according to another exemplary embodiment of the present invention includes:

As described above, according the present invention, the display device having the TSP function may be slim, and the sensor sensitivity of the TSP included in the display device having a wide viewing angle may be improved.

DETAILED DESCRIPTION OF EXEMPLARY EMBODIMENTS

Figure 1:
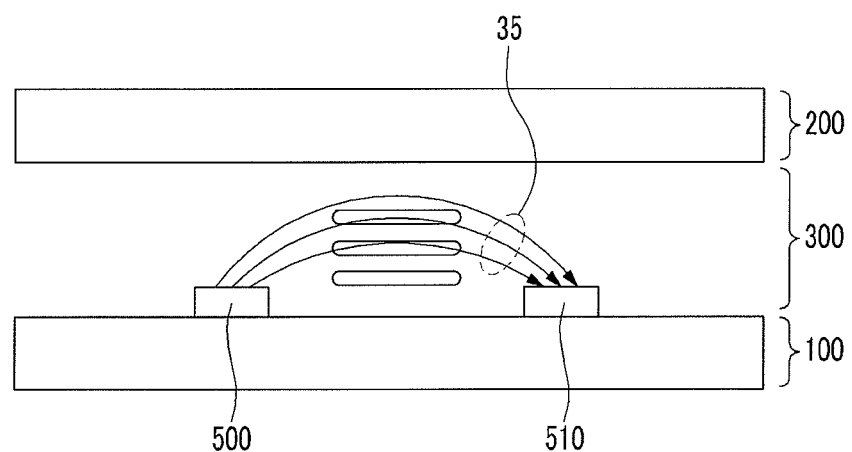
FIG. 1 is a cross-sectional view of an IPS mode liquid crystal display according to an exemplary embodiment of the present invention.

Embodiments of the present invention will be described more fully hereinafter with reference to the accompanying drawings, in which exemplary embodiments of the invention are shown. However, it is to be understood that the invention is not limited to the disclosed embodiments, but, on the contrary, is intended to cover various modifications.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification.

Firstly, a display mode of a liquid crystal display according to an exemplary embodiment of the present invention will be described. A TN (twisted nematic) mode liquid crystal display panel that is widely used may be easily bruised and has a limited viewing angle. A liquid crystal display mode provided in embodiments of the present invention may be a plane-to-line switching (hereafter, PLS) mode or an in-plane switching (hereafter, IPS) mode liquid crystal display.

An IPS mode liquid crystal display will be described with reference to FIG. 1. An IPS mode liquid crystal display uses a lateral electric field to drive the liquid crystals and includes a pixel electrode 500 and a common electrode 510 that are formed in the same plane on a lower substrate 100. That is, a liquid crystal layer 300 interposed between the upper substrate 200 and the lower substrate 100 is driven by a horizontal electric field 35 caused by the pixel electrode 500 and the common electrode 510 on the lower substrate 100. An IPS mode liquid crystal display according to the present exemplary embodiment is not limited to the described exemplary embodiment, and may be realized with various other structures in other exemplary embodiments.

Figure 2:
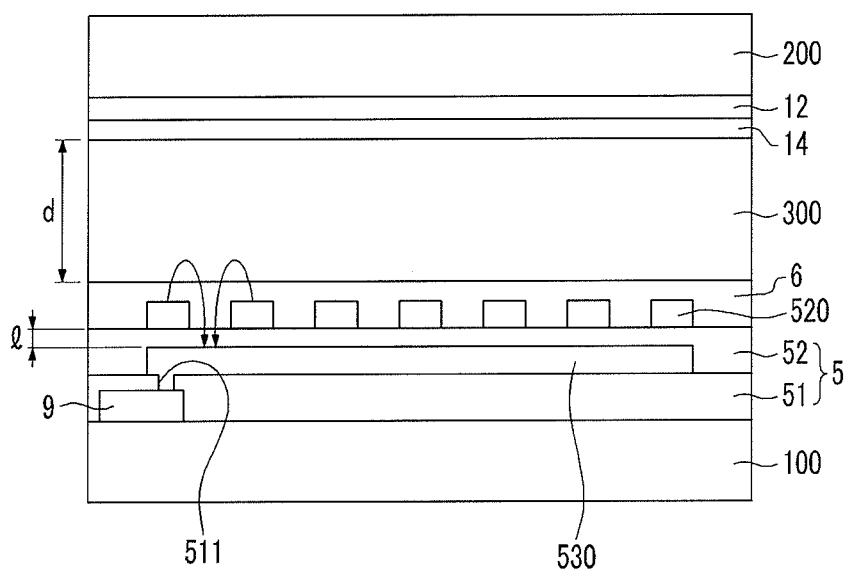
FIG. 2 is a cross-sectional view of a PLS mode liquid crystal display according to an exemplary embodiment of the present invention.

A PLS mode liquid crystal display will be described with reference to FIG. 2.

A lower substrate 100 and an upper substrate 200 face each other separated by a predetermined distance. Here, the separation distance of the lower substrate 100 and the upper substrate 200 is referred to as a cell gap (d). A liquid crystal layer 300 is interposed between the lower substrate 100 and the upper substrate 200.

Although not shown in the drawing, the lower substrate 100 includes a gate wire and a data wire that intersect and are arranged to define a unit pixel. A thin film transistor 9 for active driving is disposed near the intersection of the gate wire and the data wire. A plate-shaped electrode 530 is formed in the unit pixel of the lower substrate 100. The plate-shaped electrode 530 is made of transparent ITO (indium tin oxide, hereinafter, an ITO layer) and may have either a comb shape or a plate shape. A lower passivation layer 51 having a contact hole 511 is formed between the plate-shaped electrode 530 and the thin film transistor 9, and the plate-shaped electrode 530 is connected to the thin film transistor 9 through the contact hole 511. An upper passivation layer 52 is formed on the plate-shaped electrode 530. A linear electrode 520 overlapping the plate-shaped electrode 530 is formed with a comb shape on the upper passivation layer 52. Here, an interval/ between the plate-shaped electrode 530 and the linear electrode 520, that is, the thickness of the upper passivation layer 52, is smaller than the cell gap d. Furthermore, a horizontal alignment layer 6 to control an initial alignment of the liquid crystal molecules is formed on the surface of linear electrode 520 and the upper passivation layer 52. Here, the horizontal alignment layer 6 has a rubbing axis with a predetermined direction and a predetermined pre-tilt angle.

A color filter 12 is formed on the opposing surface of the upper substrate 200 facing the lower substrate 100. A horizontal alignment layer 14 that controls the initial alignment of the liquid crystal molecules is also formed on the surface of the color filter 12. Here, the horizontal alignment layer 14 of the upper substrate also has a predetermined pre-tilt angle, and has a rubbing axis formed at 180 degrees with respect to the rubbing axis of the horizontal alignment layer 6 of the lower substrate.

The plate-shaped electrode 530 may be applied with a pixel voltage, and the linear electrode 520 may be applied with a common voltage. Alternatively, the plate-shaped electrode 530 may be applied with the common voltage, and in this case, the linear electrode 520 may be applied with the pixel voltage. In this case, the thin film transistor 9 is connected to the linear electrode 520.

In a present exemplary embodiment, the color filter 12 formed on the upper substrate 200 may be formed on the lower substrate 100 instead of the upper substrate 200. The plate-shaped electrode 530 is not limited to ITO, and may be formed of other transparent conductors, such as IZO. A PLS mode liquid crystal display according to a present exemplary embodiment is not limited to the above-described exemplary embodiment, and may have a different shape.

Figure 3:
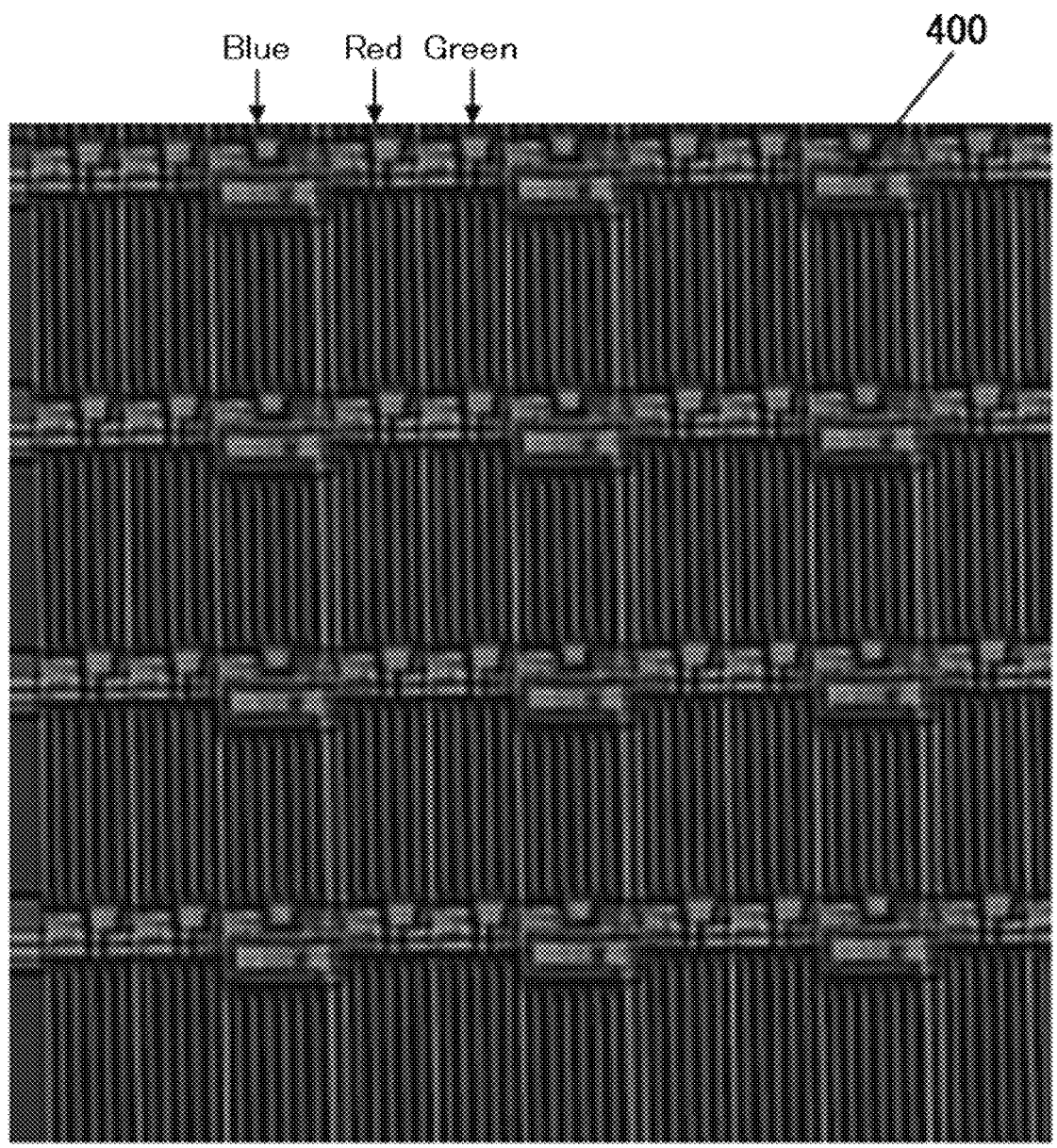
FIG. 3 is a layout view of a liquid crystal display according to an exemplary embodiment of the present invention, showing a sensor unit.

A liquid crystal display according to an exemplary embodiment of the present invention will be described with reference to FIG. 3. FIG. 3 is a top plan view showing a position of a sensor unit 400 in a pixel arrangement of a display device. The sensing sensitivity depends on the number of sensor units 400 such that sensing sensitivity increases as the number of sensor units 400 is increased. However, the number of sensor units 400 and the aperture ratio conflict to limit the number of sensor units 400 that may be incorporated in the display. In a present exemplary embodiment, as shown in FIG. 3, one sensor unit 400 is disposed for every three sub-pixels. For example, a sensor unit 400 may be disposed at a blue sub-pixel. Note however, that embodiments of the invention are not limited to this configuration, and in other embodiments, a sensor unit may be disposed at a red or a green pixel. Furthermore, the density of the sensor units may vary in other embodiments, in which some embodiments may have a sensor unit for every 2 sub-pixels, for every 4 sub-pixels, etc. In FIG. 3, while not shown in detail, a color filter representing blue, red, and green may be formed on the lower substrate 100 or the upper substrate 200.

Figure 4:
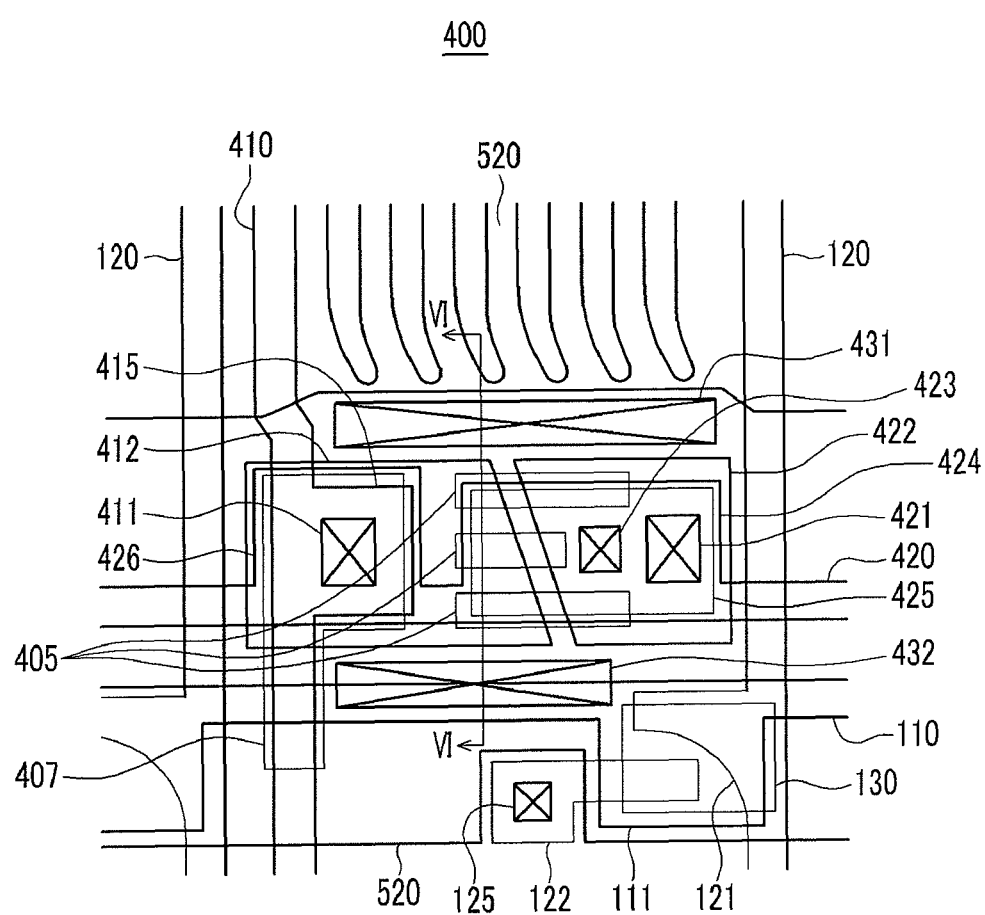
FIG. 4 is a layout view of a sensor unit of a liquid crystal display according to an exemplary embodiment of the present invention.
Figure 5:
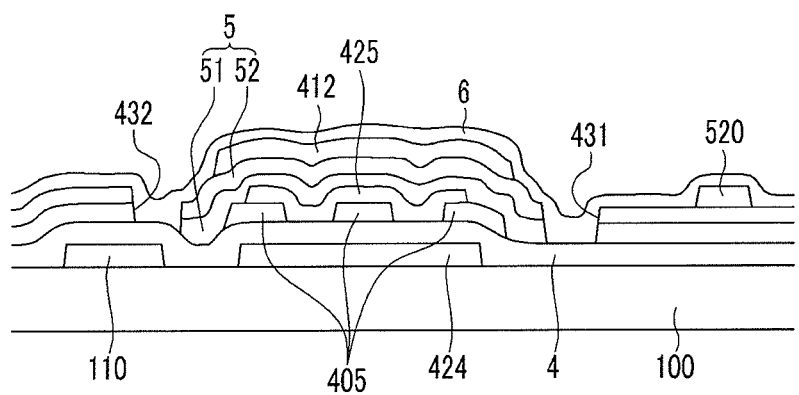
FIG. 5 is a cross-sectional view taken along the line VI-VI of FIG. 4.

A detailed structure of a sensor unit 400 will be described with reference to FIG. 4 and FIG. 5. FIG. 4 is a layout view of a sensor unit of a liquid crystal display according to an exemplary embodiment of the present invention, and FIG. 5 is a cross-sectional view taken along the line VI-VI of FIG. 4.

Figure 6:
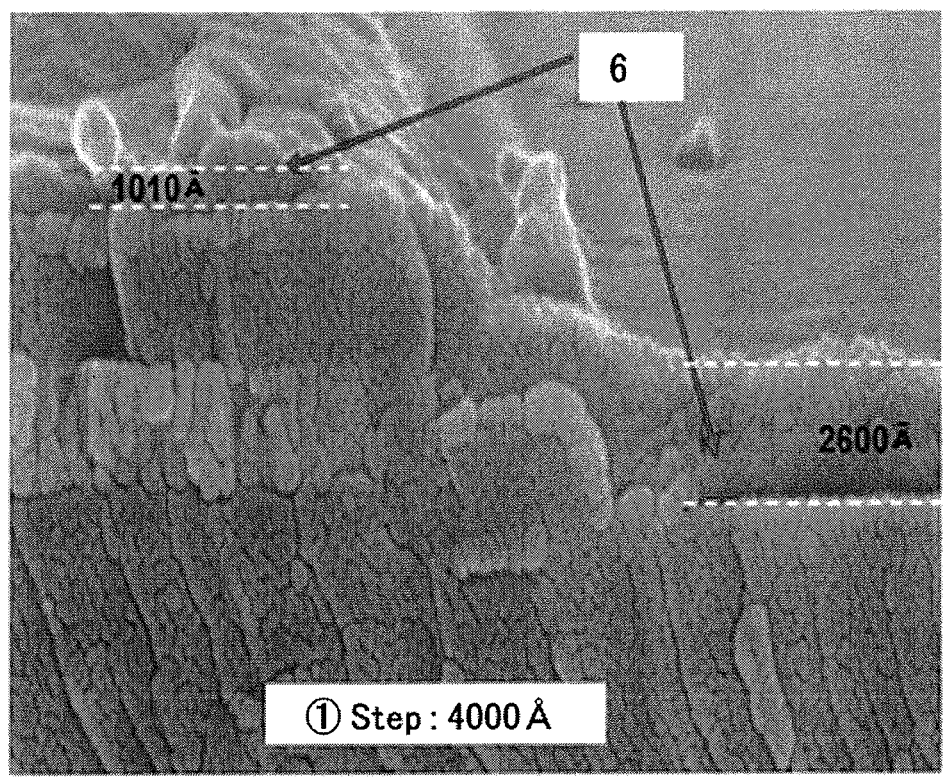
FIG. 6 is an SEM cross-sectional view showing the thickness of an alignment layer according to a structure of a sensor unit, according to an exemplary embodiment of the present invention.

A configuration of a sensor unit 400 according to a present exemplary embodiment will be described. The sensor unit 400 includes a first sensor electrode 412 and a second sensor electrode 422 that connect when touched, and first and second sensor wires 410 and 420 that can confirm a touch position by transmitting a sensing current through the connection between the first sensor electrode 412 and the second sensor electrode 422. The first sensor electrode 412 and the first sensor wire 410 are electrically connected to each other through a first contact hole 411, and the second sensor electrode 422 and the second sensor wire 420 are electrically connected to each other through a second contact hole 421, a middle conductor 425, and a third contact hole 423. A silicon protrusion pattern 405 made of silicon is formed at a portion of the sensor unit facing the sensor electrodes 412 and 422 such that the sensor electrodes 412 and 422 have a curved surface. The insulating layer is removed between the sensor electrodes 412 and 422 and the linear electrode 520, thereby forming first and second trenches 431 and 432. The linear electrode 520 is used to form an electric field for the image display. Due to the first and second trenches 431 and 432, the horizontal alignment layer material flows into the first and second trenches 431 and 432 when forming the horizontal alignment layer 6. As a result, the horizontal alignment layer 6 may be thicker inside the first and second trenches 431 and 432 than near the first and second trenches 431 and 432. In particular, a boundary portion of the horizontal alignment layer 6 forming a step may be thinner due to the first and second trenches 431 and 432. The thickness difference of the alignment layer 6 near the step due to the formation of the first and second trenches 431 and 432 may be seen in FIG. 6. FIG. 6 is a SEM (scanning electron microscope) photograph taken after forming the alignment layer. It may be confirmed that the alignment layer 6 is thinner near the first and second trenches 431 and 432 than inside the first and second trenches 431 and 432. The alignment layer 6 may be primarily made of polyimide. The alignment layer 6 is an insulating layer in which the insulating effect increases as the thickness thereof is increased, and decreases as the thickness is decreased. If the alignment layer 6 overlapping the sensor electrodes 412 and 422 is thinner due to the trenches 431 and 432, the insulating effect of the alignment layer 6 may decrease, improving touch sensing sensitivity. The trenches are not limited to the above-described first and second trenches 431 and 432, and at least one trench may have a different shape.

The vertical structure of a sensor unit 400 according to an embodiment of the invention will be described with reference to FIG. 5.

The second sensor wire 420 is disposed on the first substrate 100 and is formed in the same layer as a gate line 110 and extends in the same direction as the gate line 110. The second sensor wire 420 also includes first and second protrusions 424 and 426. A gate insulating layer 4 is disposed on the gate line 110 and the second sensor wire 420. The silicon protrusion pattern 405 and a silicon member 407 are formed on the gate insulating layer 4. The silicon protrusion pattern 405 has protrusions and depressions in the surface of the first sensor electrode 412 and the second sensor electrode 422. The protrusions and depressions may effect the flow of the alignment layer 6.

The middle conductor 425 is formed on the silicon protrusion pattern 405 at a position overlapping the first protrusion 424 of the second sensor wire 420 and is made from a same layer as a data line 120. The middle conductor 425 is connected to the second sensor wire 420 through the contact hole 423. The first sensor wire 410 is formed on the silicon member 407 from the same layer as the data line 120 and extends in the same direction as the data line 120. The first sensor wire 410 also has a protrusion 41.5 at a position overlapping the second protrusion 426 of the second sensor wire 420. A passivation layer 5 is formed on the data line 120, the first sensor wire 410, and the middle conductor 425. The passivation layer 5 includes at least one layer made of an insulating material such as silicon oxide (SiOx), silicon nitride (SiNx), and an organic insulator. In a present exemplary embodiment, the passivation layer 5 includes the lower passivation layer 51 and the upper passivation layer 52, wherein the lower passivation layer 51 insulates the data layer including the data line 120 from a plate-shaped electrode (not shown), and the upper passivation layer 52 insulates the plate-shaped electrode from the linear electrode 520. The passivation layer 5 includes the contact hole 411 exposing the first sensor wire 410, the contact hole 421 exposing the middle conductor 425, and the trenches 431 and 432 exposing the gate insulating layer 4 near the second sensor wire 420. The linear electrode 520, the first sensor electrode 412, and the second sensor electrode 422 are formed on the passivation layer 5. The first sensor electrode 412 and the second sensor electrode 422 are electrically connected to the first sensor wire 410 and the second sensor wire 420 through the contact holes 411 and 421.

The trenches 431 and 432 are disposed between the linear electrode 520, and the first and second sensor electrodes 412 and 422. The insulating layers removed to form the trenches 431 and 432 are generally limited to portions of the passivation layer 5, although portions of the gate insulating layer 4 and an additional layer may be removed. Also, the passivation layer 5 may be partially removed. The trenches 431 and 432 may be simultaneously formed when forming the contact holes 411 and 421, or may be formed through a separate removing process.

The alignment layer 6 is formed on the linear electrode 520 and the first and second sensor electrodes 412 and 422. The alignment layer 6 may be an inorganic alignment layer or an organic alignment layer. When using an organic alignment layer, roll coating printing, spin coating, or inkjet printing may be used. If an organic alignment material is coated, the solution of the alignment material flows according to the curve of the substrate, and the resulting alignment layer is thinner where the protrusions and depressions of the curve are positioned. As described above, the thickness of the alignment layer 6 may be controlled by forming the trenches 431 and 432 and the silicon protrusion pattern 405.

The gate line 110 has a protruded gate electrode 111, and the data line 120 has a source electrode 121. A semiconductor island 130 made of silicon is formed at a position overlapping the gate electrode 111, and a drain electrode 122 facing the source electrode 121 is formed on the semiconductor island 130. The drain electrode 122 is connected to the plate-shaped electrode (not shown) through a contact hole 125 formed in the passivation layer 5. The gate electrode 111, the source electrode 121, and the drain electrode 122 are three terminals of a switching element of the thin film transistor.

Although not shown in FIG. 5, the plate-shaped electrode (530 in FIG. 2) is formed between the linear electrode 520 and the first substrate 100. The plate-shaped electrode 530 is insulated from conducting elements such as the data layer or the gate layer by the lower passivation layer 51, and is insulated from the linear electrode 520 from the upper passivation layer 52.

Figure 7A:
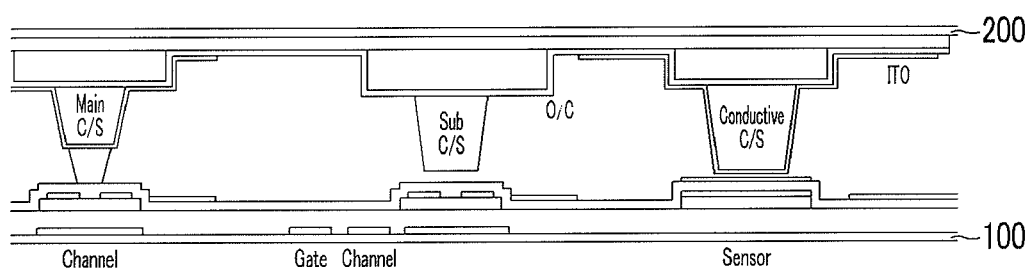
FIG. 7A is a cross-sectional view of a structure of a spacer applied to a liquid crystal display according to an exemplary embodiment of the present invention.

A sensitivity difference caused by a misalignment of a column spacer (hereafter, CS) and a sensor electrode will be described with reference to FIG. 7A to FIG. 7C. FIG. 7A is a cross-sectional view of a structure of a spacer applied to a liquid crystal display according to an exemplary embodiment of the present invention. As shown in FIG. 7A, the CSs may be formed in the upper substrate projecting toward the lower substrate. In addition, CSs having at least two different heights may be formed. The CSs may include a main CS maintaining the cell gap of the liquid crystal display and a sub-CS shorter than the main CS that assists the main CS. The main CS may be formed on the color filter by adding an insulating layer onto the ITO layer. The sub-CS is shorter than the main CS, thereby assisting the main CS. For a resistive sensor unit, the CS may be conductive to operate as an electrode corresponding to the sensor electrode. Accordingly, although the main CS and the sub-CS are formed from the same layer, a conductive layer such as ITO (indium tin oxide) or IZO (indium zinc oxide) for electrical connection may be formed on the surface of the CS.

Figure 7B:
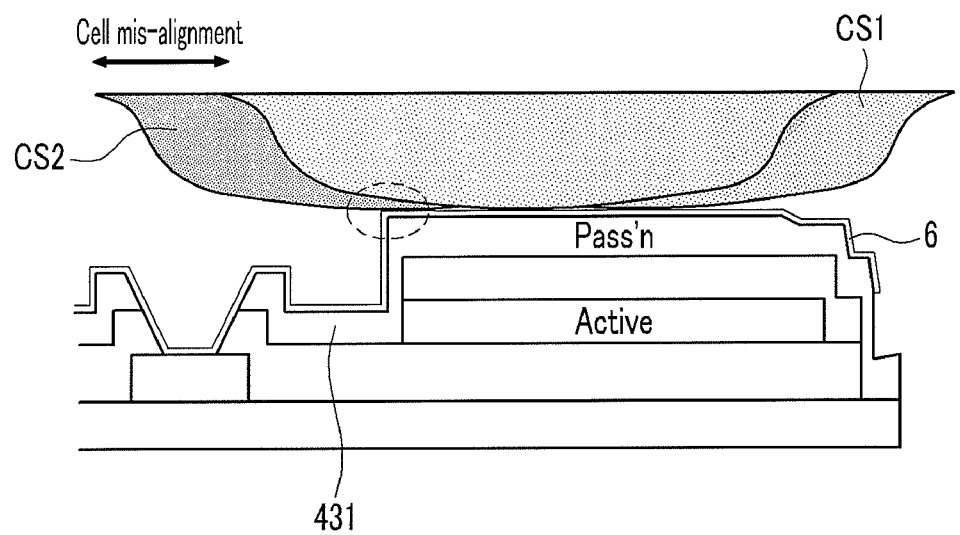
FIG. 7B is a cross-sectional view showing a misaligned spacer in a liquid crystal display according to an exemplary embodiment of the present invention.

FIG. 7B is a cross-sectional view showing a misaligned spacer in a liquid crystal display according to an exemplary embodiment of the present invention. A CS in contact with the sensor electrode and positioned at the correct position is represented as CS1, and a misaligned CS is represented as CS2.

Figure 7C:
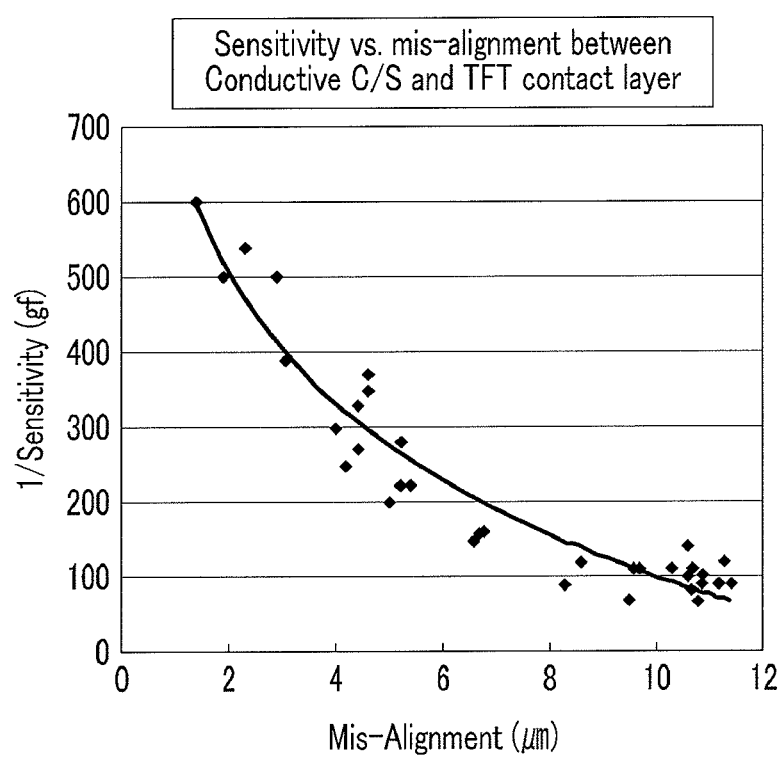
FIG. 7C is a graph showing a sensitivity change due to a misalignment in a liquid crystal display according to an exemplary embodiment of the present invention.

FIG. 7C is a graph showing a sensitivity change due to a misalignment of the sensor electrode and the CS. According to the graph of FIG. 7C, as the magnitude of the misalignment increases, the magnitude of the sensing pressure decreases. That is, because the contact portion is adjacent to where the first trench 431 is formed, the magnitude of the applied force may be small. This is why the thickness of the alignment layer 6 is decreased adjacent to the first trench 431.

For a resistive sensor unit, the conductor electrode is disposed on the CS to directly contact the sensor electrode, and for a capacitive sensor unit, the CS is spaced apart from the conductor electrode by a predetermined distance.

While embodiments of this invention have been described in connection with what is presently considered to be practical exemplary embodiments, it is to be understood that embodiments of the invention are not limited to the disclosed embodiments, but, on the contrary, are intended to cover various modifications and equivalent arrangements included within the spirit and scope of the appended claims.

What is claimed is:

1. A liquid crystal display comprising:
a first substrate;
a gate line disposed on the first substrate;
a gate insulator disposed on the gate line and first substrate;
a data line intersecting the gate line;
a first passivation layer formed on the gate insulator;
a plate-shaped electrode disposed on the first passivation layer;
a second passivation layer formed on the first passivation layer, wherein the plate-shaped electrode is interposed between the first passivation layer and the second passivation layer;
a linear electrode disposed on the second passivation layer, wherein the plate-shaped electrode overlaps the linear electrode and the second passivation layer insulates the plate-shaped electrode from the linear electrode, and wherein the first passivation layer on the first substrate insulates the linear electrode from the gate line and the data line;
a sensor unit formed on the first substrate including a first sensor electrode and a second sensor electrode for sensing a touch position;
a second substrate facing the first substrate;
a liquid crystal layer interposed between the first substrate and the second substrate;
a first trench disposed between the sensor unit and the linear electrode that exposes the gate insulator, wherein the first trench is formed by removing the first and second passivation layers between the sensor unit and the linear electrode; and
an alignment layer formed on the linear electrode and sensor unit that fills the first trench, wherein said alignment layer is thicker inside said first trench than on a boundary near the first trench.

2. The liquid crystal display of claim 1, further comprising a first sensor wire extending in a same direction as the gate line and a second sensor wire extending in a same direction as the data line,
wherein the sensor unit includes the first sensor electrode connected to the first sensor wire and the second sensor electrode connected to the second sensor wire,
wherein said first sensor electrode and said second sensor electrode connect when touched, and
said first and second sensor wires confirm a touch position by transmitting a sensing current through the connection between the first sensor electrode and the second sensor electrode.

3. The liquid crystal display of claim 1, further comprising a thin film transistor connected to the gate line and the data line,
wherein the linear electrode is connected to the thin film transistor thereby receiving a pixel voltage transmitted through the data line, and the plate-shaped electrode receives a common voltage.

4. The liquid crystal display of claim 1, further comprising a thin film transistor connected to the gate line and the data line,
wherein the linear electrode receives a common voltage, and the plate-shaped electrode is connected to the thin film transistor thereby receiving a pixel voltage transmitted through the data line.

5. The liquid crystal display of claim 2, wherein
the sensor unit further includes a silicon protrusion pattern disposed on the gate insulator and under the first sensor electrode and the second sensor electrode.

6. The liquid crystal display of claim 5, wherein
the silicon protrusion pattern includes a plurality of portions separated from each other.

7. The liquid crystal display of claim 6, further comprising a middle conductor formed on a same layer as the first sensor wire and disposed between the gate insulator and the first passivation layer that overlaps the silicon protrusion pattern, and is electrically connected to the second sensor electrode and the second sensor wire.

8. The liquid crystal display of claim 1, wherein
the sensor unit is a resistive type.

9. The liquid crystal display of claim 1, wherein
the sensor unit is a capacitive type.

10. The liquid crystal display of claim 1, further comprising
a red color filter, a green color filter, and a blue color filter formed on one of the first substrate and the second substrate,
wherein the sensor unit is disposed corresponding to one of said red color filter, green color filter, or blue color filter.

11. A liquid crystal display comprising:
a first substrate;
a gate line disposed on the first substrate;
a gate insulator disposed on the gate line and first substrate;
a data line intersecting the gate line;
a first passivation layer formed on the first substrate;
a plate-shaped electrode disposed on the first passivation layer;
a second passivation layer formed on the first passivation layer, wherein the plate-shaped electrode is interposed between the first passivation layer and the second passivation layer;
a linear electrode disposed on the second passivation layer, wherein the plate-shaped electrode overlaps the linear electrode and the second passivation layer insulates the plate-shaped electrode from the linear electrode, and wherein the first passivation layer on the first substrate insulates the linear electrode from the gate line and the data line;
a sensor unit formed on the first substrate and including a first sensor electrode and a second sensor electrode for sensing a touch position;
a second substrate facing the first substrate;
a liquid crystal layer interposed between the first substrate and the second substrate,
a first trench disposed between the sensor unit and the linear electrode that exposes the gate insulator, wherein the first trench is formed by removing the first and second passivation layers between the sensor unit and the linear electrode; and
an alignment layer formed on the linear electrode and sensor unit that fills the first trench, wherein said alignment layer is thicker inside said first trench than on a boundary near the first trench, wherein the sensor unit includes a silicon protrusion pattern disposed on the gate insulator and under the sensor electrode.

12. The liquid crystal display of claim 11, wherein the silicon protrusion pattern includes a plurality of portions separated from each other.

13. The liquid crystal display of claim 12, further comprising
a first sensor wire extending in a same direction as the gate line and a second sensor wire extending in a same direction as the data line,
wherein the sensor unit includes the first sensor electrode connected to the first sensor wire and the second sensor electrode connected to the second sensor wire,
a middle conductor formed on a same layer as the first sensor wire and disposed between the gate insulator and the first passivation layer that overlaps the silicon protrusion pattern, and is electrically connected to the second sensor electrode and the second sensor wire.

14. The liquid crystal display of claim 11, further comprising
a red color filter, a green color filter, and a blue color filter formed on one of the first substrate and the second substrate,
wherein the sensor unit is disposed corresponding to one of said red color filter, green color filter, or blue color filter.

15. The liquid crystal display of claim 11, further comprising
a plurality of column spacers formed on the second substrate that project toward the first substrate,
wherein said column spacers include main column spacers for maintaining a cell gap between the first and second substrates, and sub-column spacers shorter that the main column spacers, and
a conductive layer formed on the surface of the column spacers,
wherein said column spacers contact the sensor unit on the first substrate.

16. A liquid crystal display comprising:
a first substrate;
a gate insulator disposed on the first substrate;
a first passivation layer formed on the gate insulator;
a second passivation layer formed on the first passivation layer;
a linear electrode disposed on the second passivation layer;
a plate-shaped electrode disposed on the first passivation layer that overlaps the linear electrode and is interposed between the first passivation layer and the second passivation layer, wherein the second passivation layer insulates the plate-shaped electrode from the linear electrode;
a sensor unit formed on the first substrate that is configured to respond to a touch;
a first sensor wire disposed on the first substrate and a second sensor wire extending perpendicular to the first sensor wire;
a first trench disposed between the sensor unit and the linear electrode that exposes the gate insulator; and
an alignment layer formed on the linear electrode, the sensor unit, and the first trench,
wherein the sensor unit includes a first sensor electrode connected to the first sensor wire and a second sensor electrode connected to the second sensor wire,
wherein said first sensor electrode and said second sensor electrode electrically connect when touched, and said first and second sensor wires confirm a touch position by transmitting a sensing current through the electrical connection between the first sensor electrode and the second sensor electrode; and
wherein the first trench is formed by removing the first passivation layer and the second passivation layer between the sensor unit and the linear electrode, and said alignment layer is thicker inside said first trench than on a boundary near the first trench.

17. The liquid crystal display of claim 16, further comprising:
a gate line disposed on the first substrate extending in a same direction as the first sensor wire, wherein the gate insulator is disposed on the gate line;
a data line extending in a same direction as the second sensor wire and intersecting the gate line; and
a thin film transistor connected to the gate line and the data line,
wherein the first passivation layer insulates the linear electrode from the gate line and the data line,
wherein one of said linear electrode and said plate-shaped electrode is connected to the thin film transistor thereby receiving a pixel voltage transmitted through the data line, and
the other of said linear electrode and said plate-shaped electrode receives a common voltage.

18. The liquid crystal display of claim 16, further comprising
a second substrate facing the first substrate; and
a liquid crystal layer interposed between the first substrate and the second substrate.

* * * * *